United States Patent
Whitens et al.

(10) Patent No.: US 9,475,447 B1
(45) Date of Patent: Oct. 25, 2016

(54) VEHICLE SEAT BACK INCLUDING A DEPLOYABLE DEVICE

(71) Applicant: Ford Global Technologies, LLC, Dearborn, MI (US)

(72) Inventors: Michael James Whitens, Milford, MI (US); Mohammed Omar Faruque, Ann Arbor, MI (US); Dean M. Jaradi, Macomb, MI (US); Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/931,003

(22) Filed: Nov. 3, 2015

(51) Int. Cl.
*B60R 21/207* (2006.01)
*B60R 21/231* (2011.01)
*B60N 2/42* (2006.01)

(52) U.S. Cl.
CPC ........... *B60R 21/207* (2013.01); *B60N 2/4221* (2013.01); *B60R 21/231* (2013.01); *B60R 2021/23153* (2013.01); *B60R 2021/23169* (2013.01)

(58) Field of Classification Search
CPC .............. B60R 21/207; B60R 2021/23153
See application file for complete search history.

(56) References Cited

U.S. PATENT DOCUMENTS

| | | | |
|---|---|---|---|
| 5,251,931 A * | 10/1993 | Semchena | B60R 21/207 280/730.1 |
| 5,499,850 A * | 3/1996 | Sharp | A01K 1/0245 292/347 |
| 5,738,368 A | 4/1998 | Hammond et al. | |
| 5,836,647 A | 11/1998 | Turman | |
| 5,902,010 A * | 5/1999 | Cuevas | B60N 2/4415 280/730.1 |
| 6,648,367 B2 * | 11/2003 | Breed | B60N 2/0232 280/730.1 |
| 6,890,029 B2 | 5/2005 | Svantesson | |
| 7,401,852 B2 | 7/2008 | Humer et al. | |
| 7,549,699 B2 | 6/2009 | Humer et al. | |
| 2004/0160111 A1 * | 8/2004 | Koffler | A47C 7/022 297/452.25 |
| 2008/0147278 A1 * | 6/2008 | Breed | B60R 21/207 701/45 |
| 2010/0251950 A1 * | 10/2010 | Evans | B60N 2/58 112/475.08 |
| 2013/0015640 A1 * | 1/2013 | Lusk | B60R 21/207 280/728.2 |
| 2013/0015643 A1 * | 1/2013 | Gorman | B60R 21/207 280/730.2 |
| 2013/0093224 A1 * | 4/2013 | Dainese | B60R 21/207 297/216.12 |
| 2014/0183846 A1 * | 7/2014 | Fujiwara | B60R 21/207 280/729 |
| 2015/0076802 A1 * | 3/2015 | Tanabe | B60N 2/68 280/730.2 |
| 2015/0076885 A1 * | 3/2015 | Stone | B60N 2/6009 297/404 |
| 2015/0091282 A1 | 4/2015 | Nagasawa et al. | |

* cited by examiner

*Primary Examiner* — James English
(74) *Attorney, Agent, or Firm* — Frank A. MacKenzie; Bejin Bieneman PLC

(57) ABSTRACT

A seat back includes a frame and a deployable device mounted to the frame. The deployable device includes a back panel, a front panel opposite the back panel, and a cavity between the back panel and the front panel. An inflator is in communication with the cavity. A clip is fixed to the back panel and is engaged with the frame.

19 Claims, 9 Drawing Sheets

VEHICLE SEAT BACK INCLUDING A DEPLOYABLE DEVICE

BACKGROUND

An interior of a vehicle, such as automobile, typically includes energy absorbers for absorbing energy from an occupant of the vehicle during an impact of the vehicle. For example, a seat of the vehicle may include one or more energy absorbers. These energy absorbers may be passive, e.g., not activated before impact, or may be active, e.g., deployed when impact is sensed. Active energy absorbers may be applicable in some applications in the interior of the vehicle, such as a seat of the vehicle. However, space within the interior of the vehicle is limited and, as such, it is desirable to design components of the seat to be as small as possible. There remains an opportunity to design an active energy absorber for the seat with a reduced size before deployment.

DETAILED DESCRIPTION

Figure 1:
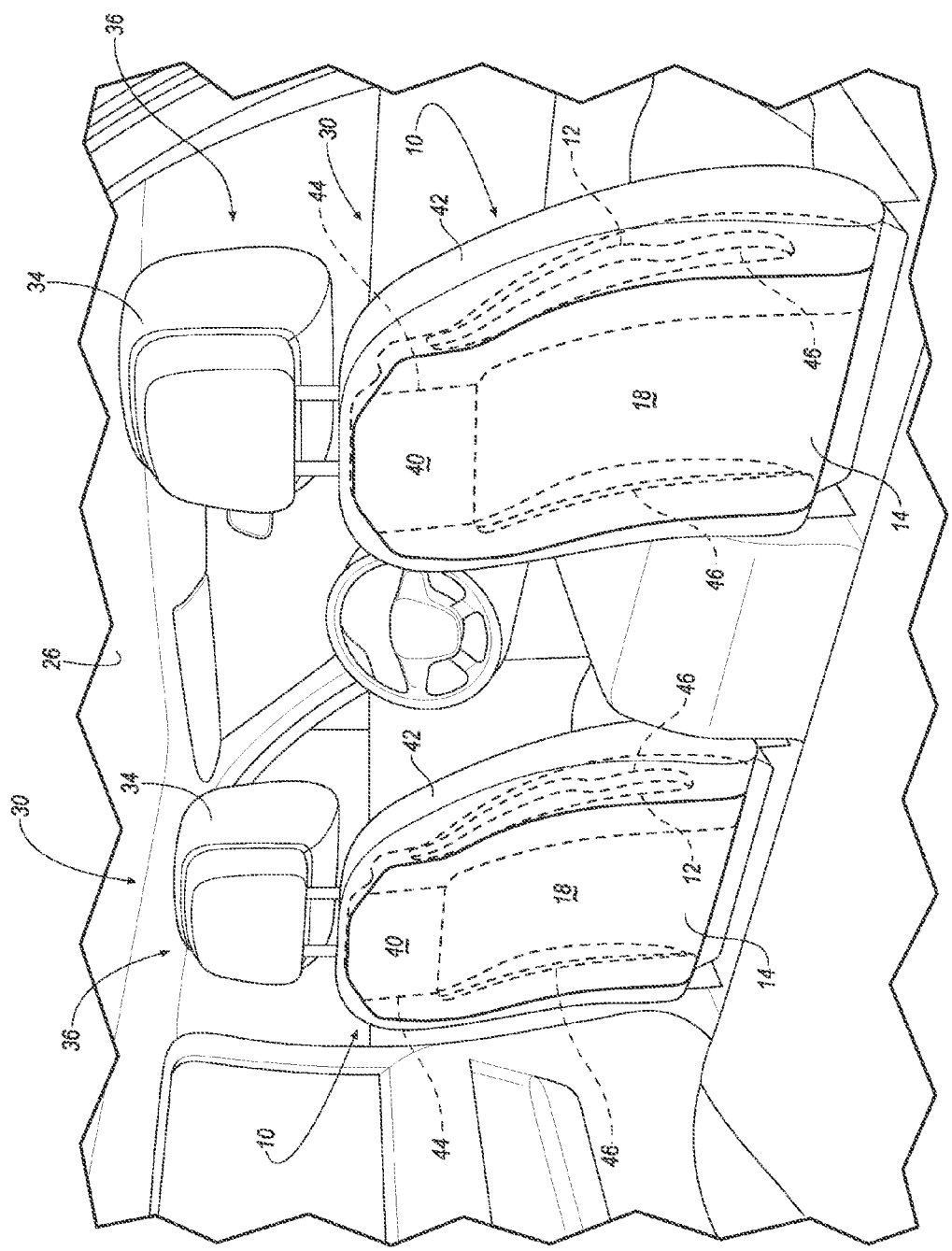
FIG. 1 is a perspective view of a portion of a vehicle including seat backs each with a deployable device in an undeployed position and a frame shown in hidden lines.

With reference to the Figures, wherein like numeral indicate like parts throughout the several views, a seat back 10 a vehicle 26 includes a frame 12 and a deployable device 14. The frame 12 includes a back panel 16, a front panel 18 opposite the back panel 16, and a cavity 20 between the back panel 16 and the front panel 18. An inflator 22 is in communication with the cavity 20. A clip 24 is fixed to the back panel 16 and is engaged with the frame 12.

Figure 2A:
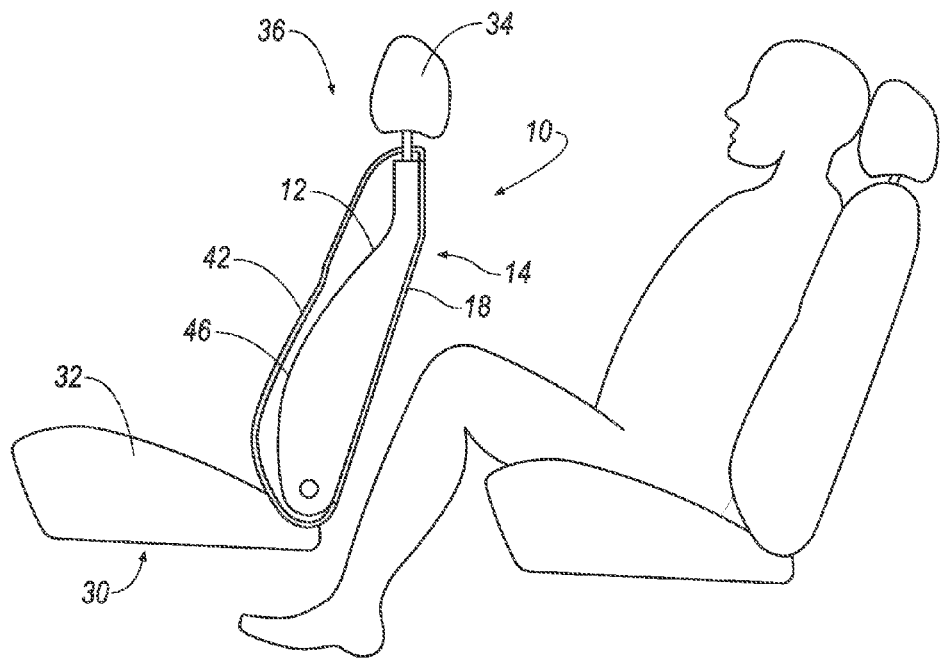
FIG. 2A is a side view the seat back, shown partially in cross-section, with the deployable device in the undeployed position.
Figure 2B:
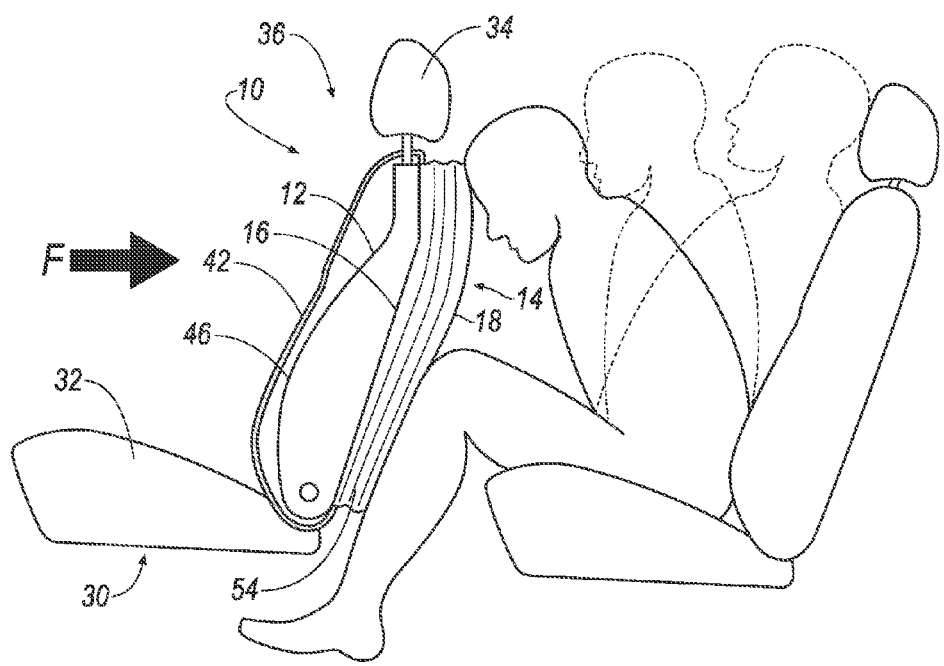
FIG. 2B is the side view of FIG. 2A with the deployable device in a deployed position.

As shown in FIGS. 2A-2B, an occupant may be seated behind the seat back 10, and may move toward the seat back 10 in a forward motion, for example, during a frontal impact of the vehicle 26 (identified with "F" in FIG. 2B). The deployable device 14 is configured to receive the knees, femur, and head of the occupant during the frontal impact to cushion the knees, femur, head and neck of the occupant. As shown in FIG. 2A, the deployable device 14 may be in an undeployed position, i.e. retracted relative to the occupant. During a frontal impact of the vehicle 26, the deployable device 14 may be selectively inflated to a deployed position, as shown in FIG. 2B. In this situation, as the occupant moves toward the seat back 10, the occupant may contact the deployable device 14, e.g., the femurs, knees, and/or head of the occupant may contact the deployable device 14.

The deployable device 14 in the deployed position may cushion the occupant and may reduce the likelihood and/or magnitude of impact energy transferred to the occupant. In particular, since the femurs and/or knees of the occupant may contact the deployable device 14 in the deployed position, the deployable device 14 may assist in cushioning impact against both a lower portion of the occupant, e.g., the femurs and/or knees, and an upper portion of the occupant, e.g., the head. As such, the deployable device 14 assists in maintaining the occupant in an upright position and in reducing forward movement of the occupant. In addition, since the head of the occupant may contact the deployable device 14 in the deployed position, the deployable device 14 may assist in reducing impact transferred to the neck of the occupant.

The deployable device 14 may be formed of a thermoplastic elastomer (TPE) material. Properties of the thermoplastic elastomer material of the deployable device 14 allows the deployable device 14 to be shaped to follow contours of the frame 12, thus providing connection points to fix the back panel 16 to the frame 12. As set forth below, the plurality of connection points may reduce or eliminate the need for specialized brackets to fix the deployable device 14 to the frame 12. The manufacturing flexibility afforded by the thermoplastic elastomer material may allow the deployable device 14 to be formed, e.g., blow molded, injection molded, etc., into any suitable shape and size, which may allow the thickness of the deployable device 14 in the undeployed position to be minimized relative to the frame thickness, i.e., the deployable device 14 has a low profile. Accordingly, the deployable device 14 may be integrated into existing seat back designs without the need for major structural alterations, which may reduce development time and cost.

The deployable device 14 may be a component of an impact absorbing system 28. Specifically, as set forth further below for example, the impact absorbing system 28 may sense an impact of the vehicle 26 and may trigger inflation of the deployable device 14 in response to the sensed impact. In addition, the impact absorbing system 28 may sense the type of impact, e.g., based on direction, magnitude, etc., and may trigger inflation of the deployable device 14 in response to the type of impact.

With reference to FIGS. 1-3B, the vehicle 26 may include a seat assembly 30. The seat assembly 30 may include the seat back 10, a seat bottom 32, and a headrest 34. The headrest 34 may be supported by the seat back 10, and may be stationary or moveable relative to the seat back 10. The seat back 10 may be supported by the seat bottom 32, and may be stationary or moveable relative to the seat bottom 32.

With reference to FIGS. 1-2B, the vehicle 26 may include a front seat 36 and a rear seat 38, and the deployable device 14 may be supported by the seat back 10 of the front seat 36. The vehicle 26 may include any suitable number of seats, i.e., one or more. The vehicle 26 may include any suitable number of rows of seats in any suitable position, e.g., a front row, a middle row (not shown), a rear row, etc. In any event, one or more deployable devices 14 may be supported by one or more of the seat backs 10. The vehicle 26 may be of any suitable type, e.g., a car, truck, SUV, etc.

Figure 3A:
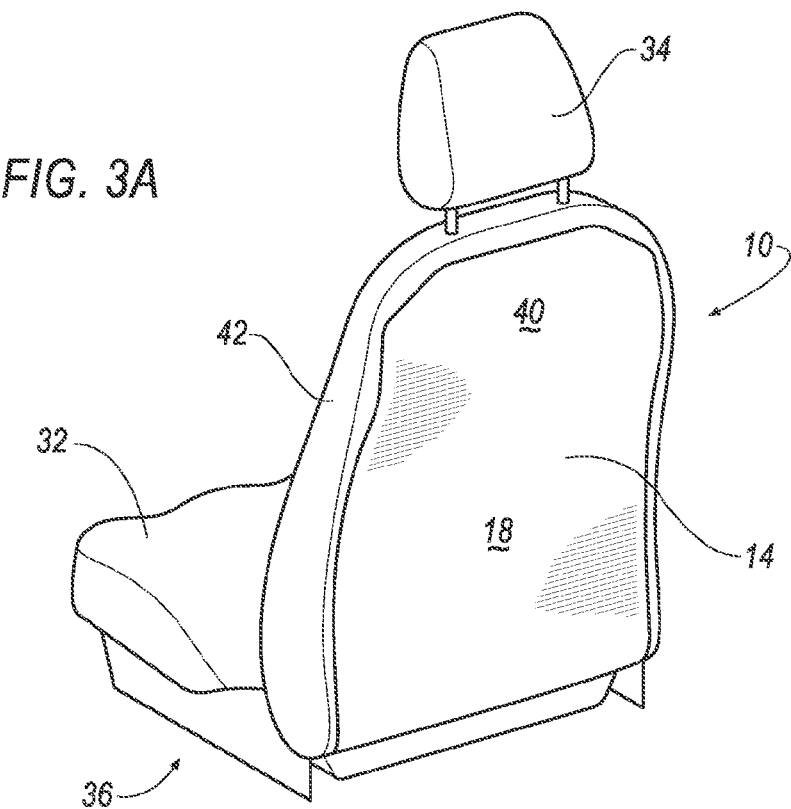
FIG. 3A is a perspective view of the frame with the deployable device in the undeployed position.

With reference to FIGS. 1, 2, and 3A, the deployable device 14, e.g. the front panel 18, may be exposed, i.e., uncovered by other components of the seat back 10. In such a configuration, the deployable device 14, e.g., the front panel 18, may have a class-A surface 40, i.e., a surface specifically manufactured to have a high quality, finished aesthetic appearance free of blemishes. The class-A surface may have any suitable surface texture. For example, the class-A surface may be smooth. As another example, the class-A surface may be grained, e.g., to simulate the appearance of leather. In addition to the surface texture, the class-A surface may have any suitable color hue and pattern, e.g., solid, grained, etc.

The seat back 10 may include trim 42 supported by the frame 12. The trim 42 may abut the deployable device 14 about a perimeter of the deployable device 14, as shown in FIGS. 1, 2, and 3A. In the alternative to being exposed, the deployable device 14 may be concealed by the trim 42. In such a configuration, at least a portion of the trim 42 may define a tear seam (not shown) to allow the deployable device 14 to deploy through the trim 42 to the deployed position. The tear seam may be a cut and/or weakening area of the trim 42. The trim 42 may be formed of any suitable material such as a polymer, e.g., nylon, plastic, foam, polypropylene (PP), acrylonitrile butadiene styrene (ABS), vinyl, etc.

With reference to FIG. 3A the frame 12 may include an upper member 44 and two side members 46. The frame 12 may include additional members (not shown). The side members 46 may be integral with the upper member 44, i.e., formed simultaneously as a single continuous frame 12. Alternatively, the side members 46 and the upper member 44 may be formed separately and subsequently welded together.

The frame 12, e.g., the upper member 44 and/or the side members 46, may be formed of any suitable plastic material, e.g., carbon fiber reinforced plastic (CFRP), glass fiber-reinforced semi-finished thermoplastic composite (organosheet), etc. Alternatively, for example, the upper member 44 and side members 46 may be formed of a suitable metal, e.g., steel, aluminum, etc.

Figure 4:
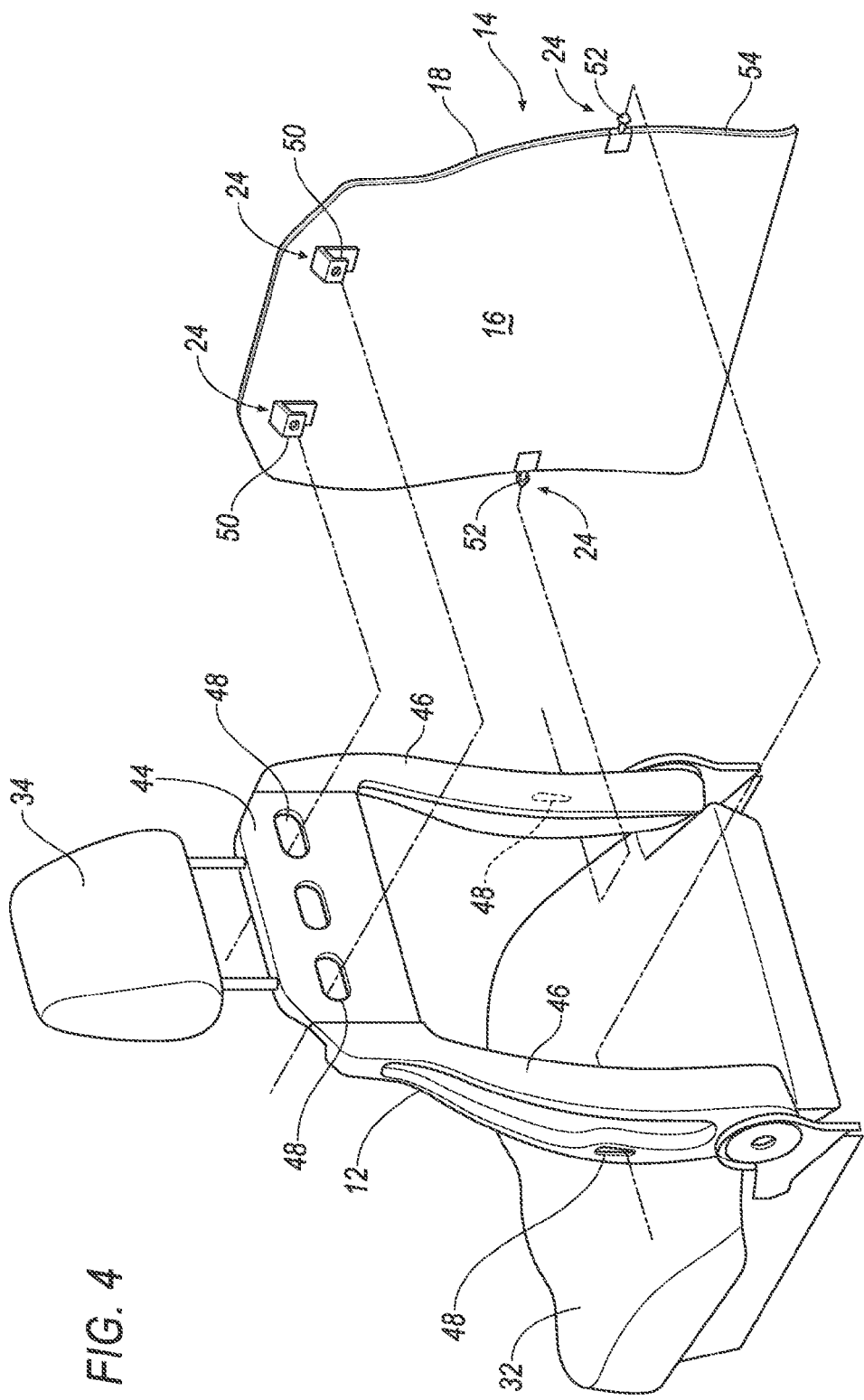
FIG. 4 is an exploded view of the deployable device and the frame.

As set forth above, the clip 24 is fixed to the back panel 16 and to the frame 12. Specifically, the deployable device 14 may include a plurality of clips 24, as shown in FIG. 4. The clips 24 may fix the back panel 16 to the frame 12. Specifically, the back panel 16 may be fixed to the upper member 44 and the side members 46. The upper member 44 and the side members 46 may include any suitable feature for engaging the clips 24. For example the upper member 44 and/or the side members 46 may include orifices 48 for receiving the clips 24. The orifices 48 may be elongated, i.e., may be slots.

The clips 24 may be of any suitable configuration and the clips 24 may have the same or different configurations as each other. For example, one or more of the clips 24 may include a hooked end 50. The hooked end 50 may be configured to engage one of the orifices 48 of the frame 12 of the seat back 10. In this case, the hooked end 50 may be fixed to the frame 12, for example, by fasteners, rivets, threaded screws, adhesion, welding, heat staking, etc. As another example, one or more of the clips 24 may include a resilient member 52. The resilient member 52 may be configured to engage one of the orifices 48 of the frame 12 of the seat back 10. The resilient member 52 may, for example, be a Christmas tree fastener, or any other suitable type of resilient member 52.

The clips 24 may be integral with the back panel 16, i.e., formed simultaneously as a single continuous unit. For example, the hooked ends 50 and the back panel 16 may be blow molded from the same piece of material, injection molded together, etc. Alternatively, the clips 24 and the back panel 16 may be formed separately and subsequently fixed together, e.g., welded, adhered, etc. In this case, the clips 24 may be formed of the same type of material as the back panel 16 or any other suitable material, e.g., metal, such as steel, aluminum, etc., plastic, such as acrylonitrile butadiene styrene (ABS), polyvinyl chloride (PVC), etc.

In addition to, or in the alternative to the clips 24, the deployable device 14 may be bonded, i.e., welded or adhered, to the frame 12. The deployable device 14 may be bonded to the frame 12 in any suitable fashion. For example, where the frame 12 is formed of a plastic material, as set forth above, the back panel 16 may be welded, e.g., ultrasonically welded, to the frame 12. As another example, where the frame 12 is formed of plastic, the back panel 16 may be adhered, to the frame 12 with, for example, epoxy adhesive, acrylic adhesive, etc. As another example, where the frame 12 is formed of metal, the back panel 16 may be adhered to the frame 12 e.g., epoxy adhesive, acrylic adhesive, etc. As yet another example, the back panel 16 may be both adhered and welded to the frame 12, e.g., for a hybrid frame 12 formed of multiple material types. In any event, the weld and/or adhesive is configured to hold the back panel 16 of the deployable device 14 to the frame 12 in both the undeployed position and the deployed position. The orifices 48 and clips 24 may be used to properly position the deployable device 14 on the frame 12 prior to bonding.

As set forth above, the cavity 20 of the deployable device 14 may be defined to be between the front panel 18 and the back panel 16. The deployable device 14 may include an intermediate portion 54 extending from the back panel 16 to the front panel 18. The intermediate portion 54 may enclose the cavity 20 between the front panel 18 and the back panel 16. The cavity 20 may be sealed between the front panel 18, the back panel 16, and the intermediate portion 54 in an airtight fashion. Alternatively, the front panel 18, the back panel 16, and/or the intermediate portion 54 may include vents or other holes (not shown) to allow cavity 20 deflation by the occupant.

The intermediate portion 54 may be integral with at least one of the back panel 16 and the front panel 18, i.e., formed simultaneously as a single continuous unit with one of the back panel 16 and the front panel 18. For example, the front panel 18, the back panel 16, and/or the intermediate portion 54 may be integrally formed by blow molding, or alternatively, may be integrally formed in any suitable fashion. In the alternative to being integrally formed, the front panel 18, the back panel 16, and/or the intermediate portion 54 may be formed separately from each other and subsequently assembled, e.g., by welding, adhering, etc.

As one example, the intermediate portion 54 and the front panel 18 may be integrally formed, e.g., by blow molding, and may be subsequently assembled to the back panel 16, e.g., by welding. As another example, the intermediate portion 54 and the back panel 16 may be integrally formed, e.g., by blow molding, and may be subsequently assembled to the front panel 18, e.g., by welding.

Figure 6A:
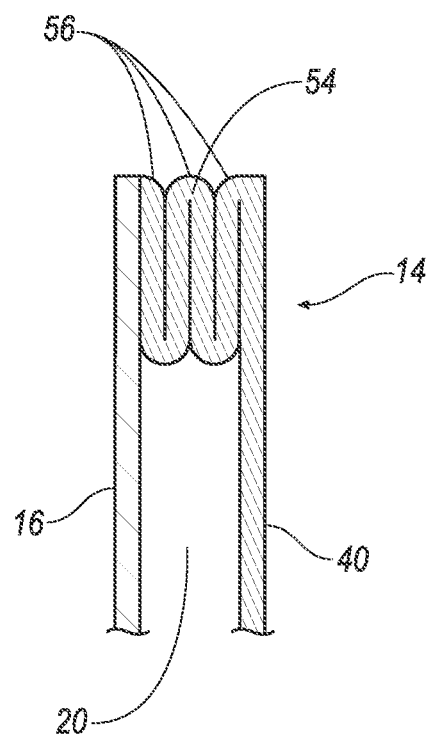
FIG. 6A is a cross-sectional view of a portion of the deployable device in the undeployed position.
Figure 6B:
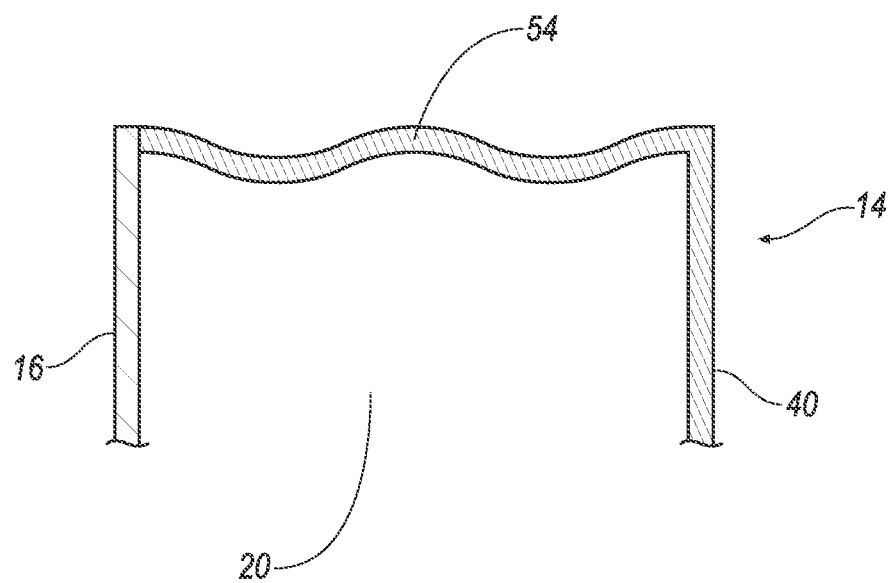
FIG. 6B is a cross-sectional view of the deployable device in the deployed position.

With reference to FIGS. 6A and 6B, the intermediate portion 54 may be folded between the front panel 18 and the back panel 16 in the undeployed position, i.e., may define one or more folds 56 between the front panel 18 and the back panel 16 in the undeployed position. As the deployable device 14 is inflated to the deployed position, the folds 56 of the intermediate portion 54 may unfold to allow the front panel 18 to move away from the back panel 16.

As set forth above, the deployable device 14 is formed of a thermoplastic elastomer, e.g., the front panel 18, the back panel 16, and/or the intermediate portion 54 may be formed of a thermoplastic elastomer. The thermoplastic elastomer is a polymeric material with both thermoplastic and elastomeric properties. A suitable class of TPE material may be, for example, thermoplastic olefin (TPO). The front panel 18, the back panel 16, and the intermediate portion 54 may be formed of the same type of material or may be formed of different types of material.

The elastomeric properties of the deployable device 14 in the deployed position may allow the front panel 18, the bottom panel, and/or the intermediate portion 54 to stretch to a size greater than their respective sizes when in the undeployed position. The stretching may be elastic, i.e., may not cause permanent deformation, or may be plastic, i.e., may permanently deform. In the alternative, the front panel 18, back panel 16, and or intermediate portion 54 may maintain their thickness, i.e., not stretch when the deployable device 14 inflates to the deployed position. The material thicknesses of each of the front panel 18, the back panel 16, and the intermediate portion 54 may be uniform, and may be between 1-3 mm in the undeployed position.

As set forth above, the inflator 22 is in communication with the cavity 20 of the deployable device 14 expands the cavity 20 with an inflation medium, such as a gas. The inflator 22 may be, for example, a pyrotechnic inflator that uses a chemical reaction to drive the inflation medium to the cavity 20. Alternatively, the inflator 22 may be, for example, a cold-gas inflator that, when activated, ignites a pyrotechnic charge that creates an opening for releasing the pressurized inflation medium to the cavity 20 via a fill tube. Alternatively, the inflator 22 may be of any suitable type, for example, a hybrid inflator.

Figure 5:
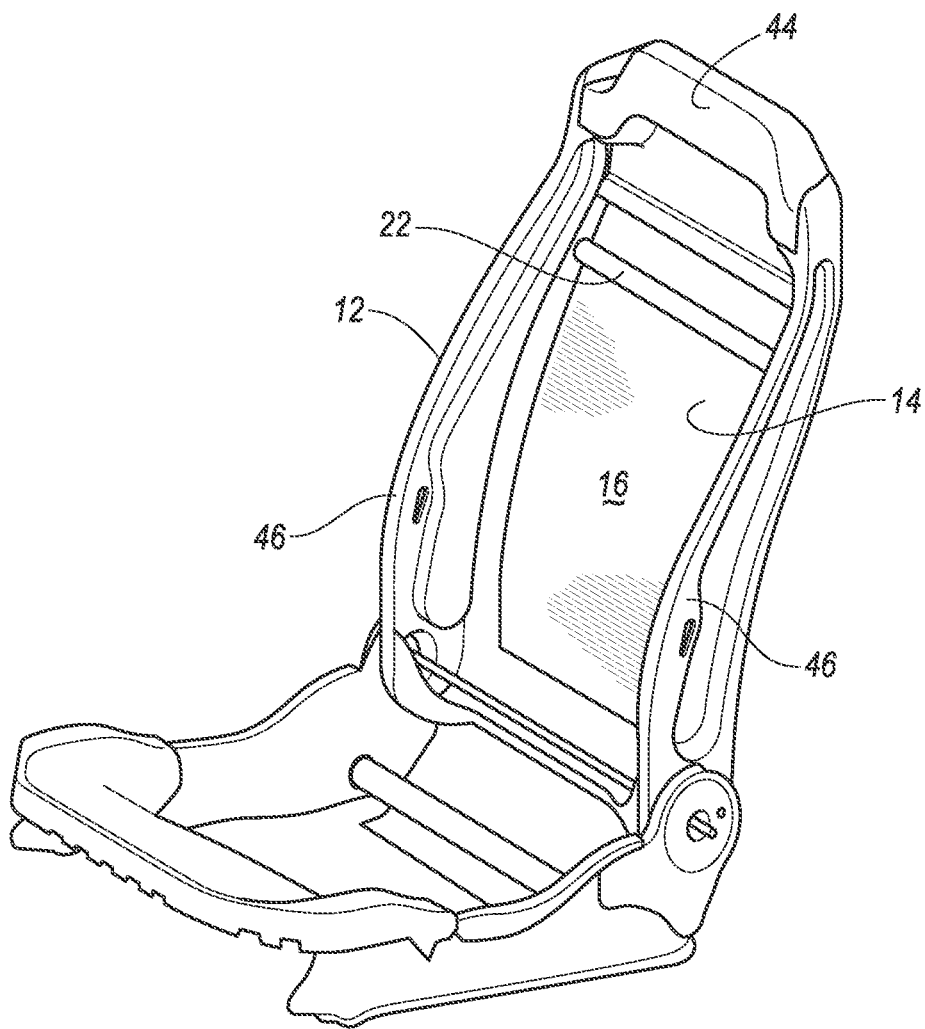
FIG. 5 is a front perspective view of the frame and the deployable device including an inflator mounted to the frame.

As shown in FIG. 5, the inflator 22 may be mounted to the frame 12, e.g., may be engaged with and extend between the side members 46. In such a configuration, the inflator 22 may be in direct fluid communication with the deployable device 14. Alternatively, the inflator 22 may be fluidly connected to the deployable device 14 through a fill tube (not shown in FIG. 5).

Figure 7:
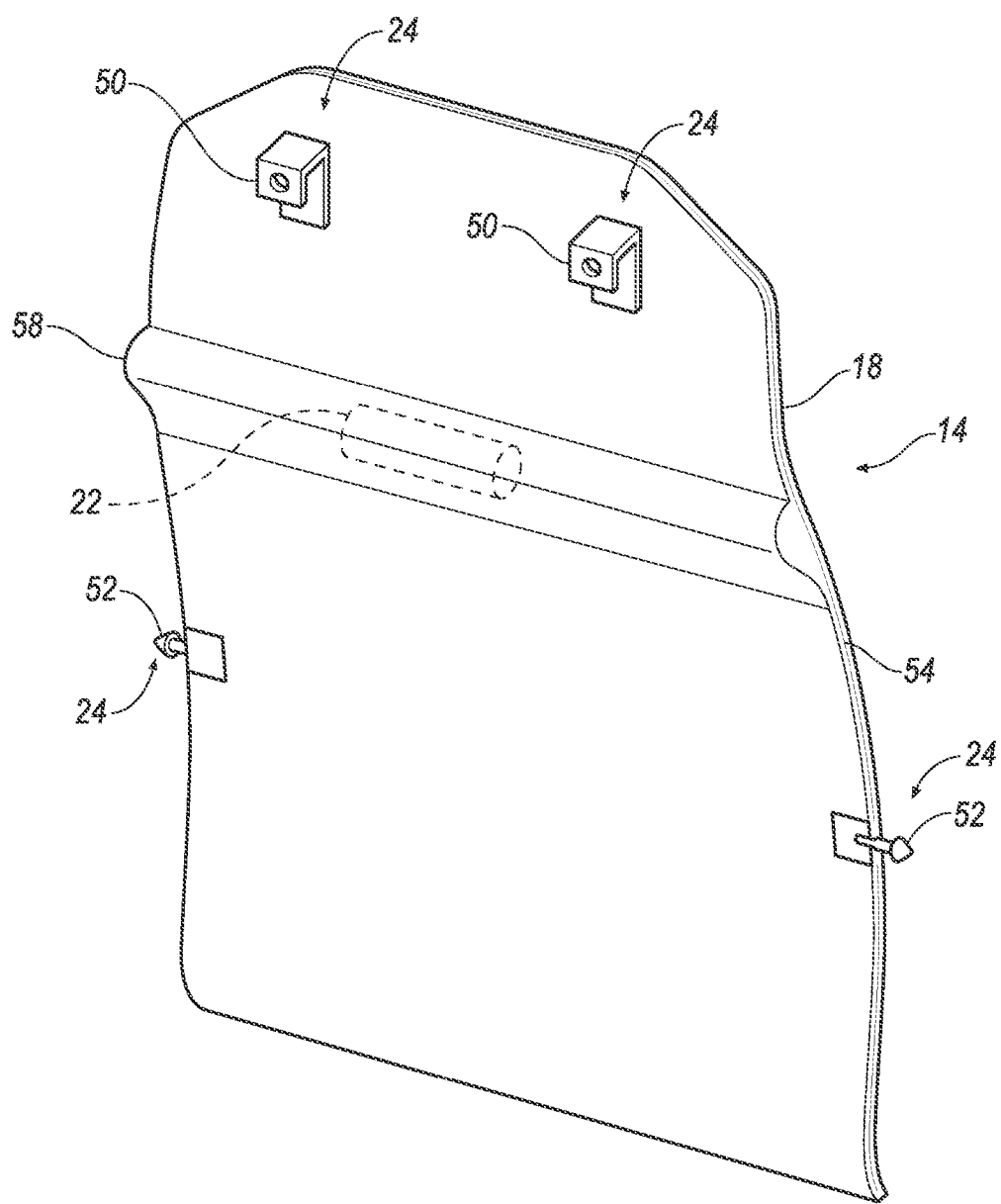
FIG. 7 is a perspective view of another embodiment of the deployable device with the inflator disposed in an inflatable cavity of the deployable device.

With reference to FIG. 7, another embodiment of the deployable device 14 including the inflator 22 mounted to the back panel 16 and disposed in the cavity 20. In this configuration, the deployable device 14, e.g., the back panel 16, may define a housing 58. The inflator 22 may be disposed in the housing 58. The housing 58 may be integrally formed with the rest of the back panel 16.

Figure 8:
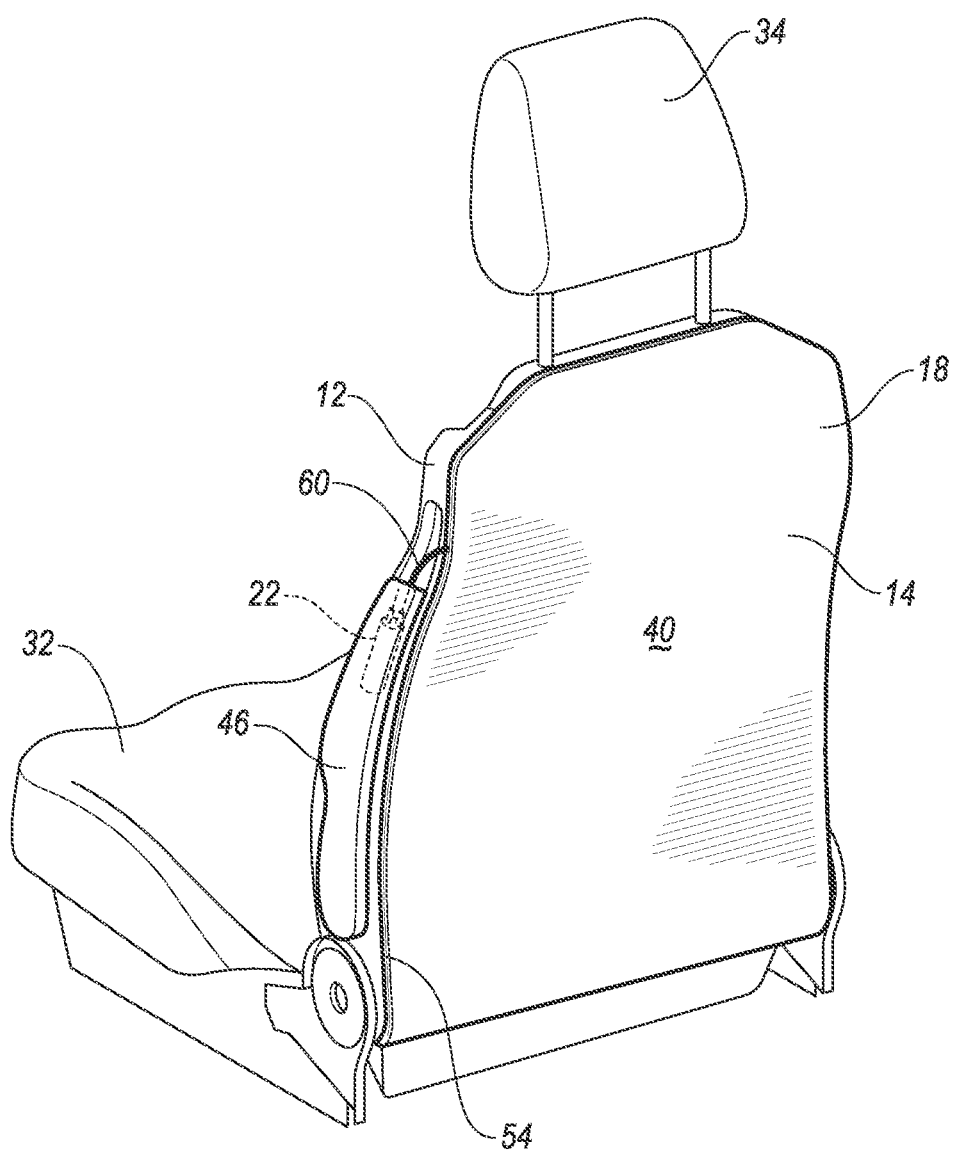
FIG. 8 is a perspective view of another embodiment of the deployable device with the inflator mounted on the frame.

With reference to FIG. 8, alternatively, the inflator 22 may be mounted to the back panel 16 external to the cavity 20. Specifically, the inflator 22 may be mounted to the frame 12, e.g., upper member 44, side member 46, etc., remote from the deployable device 14 in communication with the cavity 20 through a fill tube 60. As one example, the inflator 22 may be mounted to the frame 12 as shown an described in U.S. patent application Ser. No. 14/843,245, which is hereby incorporated by reference.

Figure 9:
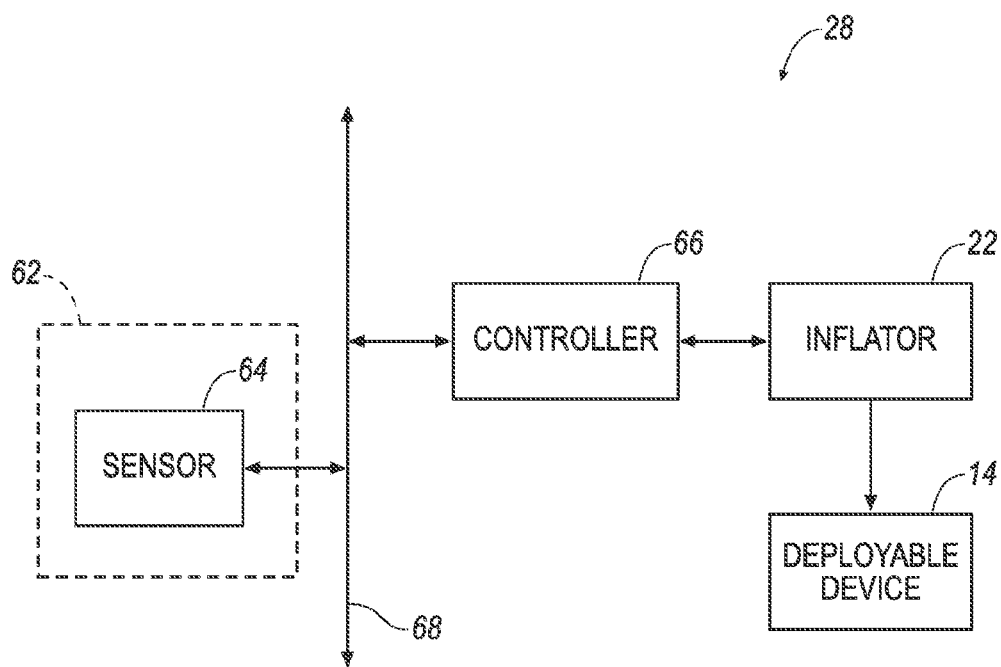
FIG. 9 is a schematic of an impact absorbing system.

With reference to FIG. 9, the vehicle 26 may include an impact sensing system 62 including at least one sensor 64 for sensing impact of the vehicle 26. The impact sensing system 62 may include a controller 66 in communication with the sensor 64 and the inflator 22 for activating the inflator 22, e.g., for providing an impulse to a pyrotechnic charge of the inflator 22, when the sensor 64 senses an impact of the vehicle 26. Alternatively or additionally to sensing impact, the impact sensing system 62 may be configured to sense impact prior to impact, i.e., pre-impact sensing. The sensor 64 may be of any suitable type, e.g., using radar, lidar, and/or a vision system. The vision system may include one or more cameras, CCD image sensors, and/or CMOS image sensor, etc.

The controller 66 may be a microprocessor-based controller. The sensor 64 is in communication with the controller 66 to communicate data to the controller 66. Based on the data communicated by the sensor 64, the controller 66 instructs the inflator 22 to activate. The controller 66 may be programmed to activate the inflator 22 to inflate the deployable device 14 to the deployed position in response at least to a front impact of the vehicle 26. Specifically, the sensor 64 may sense the front impact and, based on the sensed front impact, the controller 66 may provide an instruction to the inflator 22 to inflate the deployable device 14. The controller 66 and the sensor 64 may be connected to a communication bus 68, such as a controller area network (CAN) bus, of the vehicle 26. The controller 66 may use information from the communication bus 68 to control the activation of the inflator 22. The inflator 22 may be connected to the controller 66, as shown in FIG. 8, or may be connected directly to the communication bus 68.

Figure 3B:
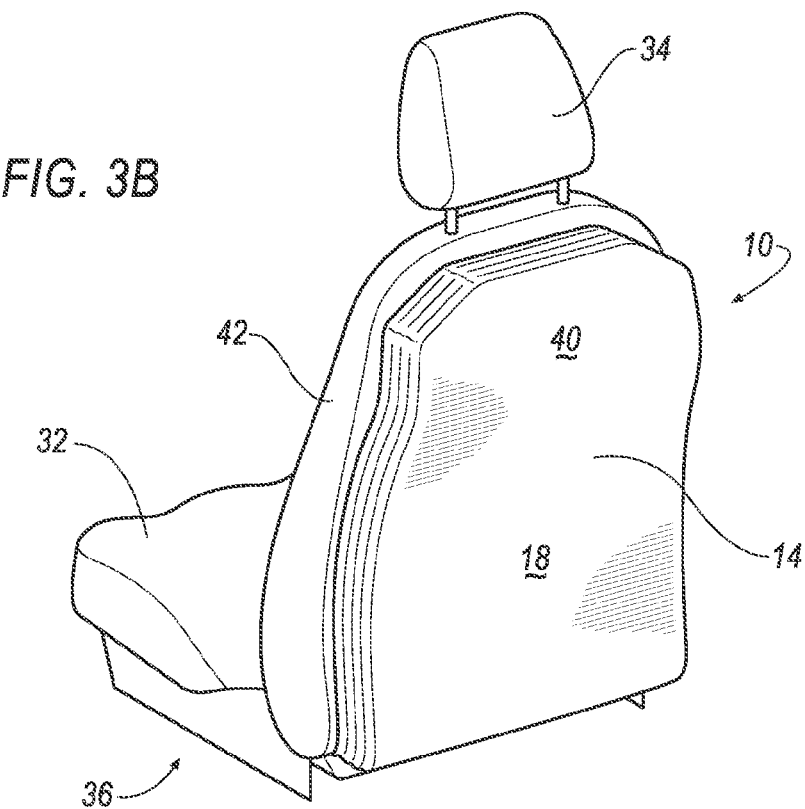
FIG. 3B is the perspective view FIG. 3A with the deployable device in the deployed position.

In operation, the deployable device 14 is in the undeployed position, as shown in FIGS. 1, 2A and 3A, under normal operating conditions of the vehicle 26. When the sensor 64 senses an impact of the vehicle 26, the impact sensing system 62 triggers the inflator 22 to inflate the deployable device 14 with the inflation medium from the undeployed position to the deployed position. In particular, based on the type of impact sensed by the impact sensing system 62, the impact sensing system 62 inflates the deployable device 14 to the deployed position as shown in FIGS. 2B and 3B.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seat back comprising:
   a frame;
   a deployable device including a back panel, a front panel opposite the back panel, and a cavity defined by the back panel and the front panel;
   an inflator in fluid communication with the cavity of the deployable device to expand the cavity with an inflation medium; and
   a clip fixed to the back panel and engaged with the frame.

2. The seat back as set forth in claim 1, wherein the clip is integral with the back panel.

3. The seat back as set forth in claim 1, wherein the clip includes a hooked end.

4. The seat back as set forth in claim 1, wherein the frame defines a slot and wherein the frame defines a slot and wherein the clip includes a resilient finger engaged with the slot.

5. The seat back as set forth in claim 1, wherein the back panel is bonded to the frame.

6. The seat back as set forth in claim 1, wherein the back panel is welded to the frame.

7. The seat back as set forth in claim 1, wherein the back panel is adhered to the frame.

8. The seat back as set forth in claim 1, wherein the front panel is formed of a thermoplastic elastomer.

9. The seat back as set forth in claim 1, wherein the deployable device is formed of a thermoplastic elastomer.

10. The seat back as set forth in claim 9, wherein the frame is formed of a plastic material.

11. The seat back as set forth in claim 1, wherein the deployable device includes an intermediate portion extending from the back panel to the front panel, the cavity being defined between the front panel, the back panel, and the intermediate portion.

12. The seat back as set forth in claim 11, wherein the intermediate portion is folded between the front panel and the back panel.

13. The seat back as set forth in claim 11, wherein the intermediate member is integral with at least one of the back panel and the front panel.

14. The seat back as set forth in claim 1, wherein the inflator is disposed within the cavity.

15. The seat back as set forth in claim 10, wherein the inflator is mounted to the back panel.

16. The seat back as set forth in claim 1, wherein the inflator is mounted to the frame.

17. The seat back as set forth in claim 1, wherein the thicknesses of the front panel is between 1-3 mm.

18. The seat back as set forth in claim 1, wherein the front panel includes a class-A surface.

19. The seat back as set forth in claim 18, wherein the class-A surface has a grained texture.

\* \* \* \* \*